(12) United States Patent
Rivas et al.

(10) Patent No.: US 9,863,790 B1
(45) Date of Patent: Jan. 9, 2018

(54) DEVICES AND METHODS FOR A ROTARY ENCODER

(71) Applicant: X Development LLC, Mountain View, CA (US)

(72) Inventors: Miguel Rivas, San Francisco, CA (US); Jeffrey Thomas Bingham, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 240 days.

(21) Appl. No.: 14/733,530

(22) Filed: Jun. 8, 2015

(51) Int. Cl.
*G01D 5/347* (2006.01)

(52) U.S. Cl.
CPC ..... *G01D 5/34738* (2013.01); *G01D 5/34715* (2013.01)

(58) Field of Classification Search
CPC ............... G01D 5/347; G01D 5/34707; G01D 5/34715; G01D 5/3473; G01D 5/34738
See application file for complete search history.

(56) References Cited

U.S. PATENT DOCUMENTS

| | | | | |
|---|---|---|---|---|
| 4,305,281 A * | 12/1981 | Lee | ....................... | G01F 25/003 702/100 |
| 4,920,259 A | 4/1990 | Epstein | | |
| 5,227,930 A * | 7/1993 | Thanos | .............. | G11B 5/59677 360/77.03 |
| 5,875,027 A * | 2/1999 | Ishiguro | .................. | G11B 5/84 356/243.4 |
| 5,898,491 A * | 4/1999 | Ishiguro | ................. | G01N 21/93 257/E21.53 |
| 6,291,815 B1 * | 9/2001 | Sugiyama | .......... | G01D 5/24466 250/231.13 |
| 6,407,683 B1 * | 6/2002 | Dreibelbis | .......... | H03M 1/0626 318/560 |
| 8,531,183 B2 * | 9/2013 | Kang | ....................... | G01B 7/30 324/244.1 |
| 8,692,978 B2 * | 4/2014 | Hardeman | ......... | G01D 5/34715 355/68 |
| 8,863,803 B2 | 10/2014 | Nakano | | |
| 8,873,358 B2 * | 10/2014 | Saito | ...................... | G11B 27/36 369/44.32 |
| 9,157,770 B2 * | 10/2015 | Omura | ................. | G01D 5/3473 |
| 9,372,481 B2 * | 6/2016 | Matsutani | .......... | G05B 23/0224 |
| 9,427,872 B1 * | 8/2016 | Bingham | ............... | B25J 9/1692 |
| 2005/0002032 A1 | 1/2005 | Wijntjes et al. | | |

(Continued)

*Primary Examiner* — John Lee
(74) *Attorney, Agent, or Firm* — McDonnell Boehnen Hulbert & Berghoff LLP

(57) ABSTRACT

An encoder is provided that comprises a disk to rotate about an axis. The encoder also comprises a first index mark and a second index mark on the disk. A first orientation of the disk associated with the first index mark is at an offset angle to a second orientation of the disk associated with the second index mark. The encoder also comprises a detector to provide an index signal responsive to an index mark being aligned with the detector. The device also comprises a controller to receive a first index signal and a second index signal from the detector, determine an angle of rotation of the disk between provision of the first index signal and provision of the second index signal, and identify a defect in the encoder based on the angle of rotation being different from the offset angle.

20 Claims, 7 Drawing Sheets

(56) References Cited

U.S. PATENT DOCUMENTS

| | | | |
|---|---|---|---|
| 2009/0314930 A1* | 12/2009 | Jones | G01D 5/2451 250/231.13 |
| 2011/0199074 A1* | 8/2011 | Kang | G01D 5/24495 324/207.25 |
| 2013/0144553 A1* | 6/2013 | Omata | G01D 5/245 702/151 |
| 2013/0258328 A1 | 10/2013 | Sugimoto et al. | |
| 2013/0301059 A1* | 11/2013 | Mayer | G01B 11/26 356/614 |
| 2014/0064050 A1* | 3/2014 | Saito | G11B 27/36 369/53.19 |
| 2014/0091213 A1* | 4/2014 | Omura | G01D 5/3473 250/231.13 |
| 2014/0277730 A1* | 9/2014 | Nakamura | B25J 13/088 700/258 |
| 2015/0160041 A1* | 6/2015 | Hikichi | G01D 5/34707 324/207.25 |
| 2015/0198467 A1* | 7/2015 | Nakamura | G01D 5/3473 250/231.14 |

* cited by examiner

300

302 — Receive a first index signal provided by a detector

304 — Receive a second index signal provided by the detector after the first index signal 306 — Determine an angle of rotation of an encoder disk between provision of the first index signal by the detector and provision of the second index signal by the detector 308 — Provide an output indicative of an orientation of the encoder disk

FIG. 3

DEVICES AND METHODS FOR A ROTARY ENCODER

BACKGROUND

A rotary encoder is an electro-mechanical device that converts the angular position or motion of a moveable component such as a shaft to an analog or digital code. An absolute encoder may indicate the current position of the component. An incremental encoder may provide information about the motion of the component, which may be further processed into information such as speed, distance, or position. Encoders may be utilized to measure motion or position in various applications including industrial controls, robotics, special purpose photographic lenses, computer input devices such as optomechanical mice or trackballs, controlled stress rheometers, or rotating platforms among other possibilities.

SUMMARY

In one example, an encoder is provided that comprises a disk to rotate about an axis. The encoder also comprises a first index mark on the disk at a first location associated with the disk being at a first orientation about the axis. The encoder also comprises a second index mark on the disk at a second location associated with the disk being at a second orientation about the axis. The first orientation is at an offset angle to the second orientation. The encoder also comprises a detector to provide an index signal responsive to an index mark being aligned with the detector. The encoder also comprises a controller to receive, responsive to rotation of the disk, a first index signal provided by the detector, and a second index signal provided by the detector after the first index signal. The controller also determines an angle of rotation of the disk between provision of the first index signal by the detector and provision of the second index signal by the detector. The controller also identifies a defect in the encoder based on the angle of rotation being different from the offset angle.

In another example, a method is provided that involves a computing device causing a disk of an encoder to rotate about an axis. The computing device includes one or more processors. The disk includes a first index mark at a first location associated with the disk being at a first orientation about the axis. The disk includes a second index mark at a second location associated with the disk being at a second orientation about the axis. The first orientation is at an offset angle to the second orientation. The method also involves receiving a first index signal provided by a detector of the encoder. The detector is configured to provide an index signal responsive to an index mark being aligned with the detector. The method also involves receiving a second index signal provided by the detector after the first index signal. The method also involves determining an angle of rotation of the disk between provision of the first index signal by the detector and provision of the second index signal by the detector. The method also involves identifying a defect in the encoder based on the angle of rotation being different from the offset angle.

In yet another example, a method is provided that involves a computing device providing a first index mark at a first location on an encoder disk. The computing device includes one or more processors. The first location is associated with the encoder disk being at a first orientation about an axis. The method also involves providing a second index mark at a second location on the encoder disk. The second location is associated with the encoder disk being at a second orientation about the axis. The first orientation is at an offset angle to the second orientation. A detector is configured to provide an index signal responsive to an index mark being aligned with the detector. The method also involves rotating the encoder disk about the axis. The method also involves receiving a first index signal provided by the detector, and a second index signal provided by the detector after the first index signal. The method also involves determining an angle of rotation of the disk between receipt of the first index signal and receipt of the second index signal. The method also involves identifying a defect in the encoder disk based on the angle of rotation being different from the offset angle.

In still another example, a system is provided that includes means for causing a disk of an encoder to rotate about an axis. The disk includes a first index mark at a first location associated with the disk being at a first orientation about the axis. The disk includes a second index mark at a second location associated with the disk being at a second orientation about the axis. The first orientation is at an offset angle to the second orientation. The system also includes means for receiving a first index signal provided by a detector of the encoder. The detector is configured to provide an index signal responsive to an index mark being aligned with the detector. The system also includes means for receiving a second index signal provided by the detector after the first index signal. The system also includes means for determining an angle of rotation of the disk between provision of the first index signal by the detector and provision of the second index signal by the detector. The system also includes means for identifying a defect in the encoder based on the angle of rotation being different from the offset angle.

In still another example, a system is provided that includes means for providing a first index mark at a first location on an encoder disk. The first location is associated with the encoder disk being at a first orientation about an axis. The system also includes means for providing a second index mark at a second location on the encoder disk. The second location is associated with the encoder disk being at a second orientation about the axis. The first orientation is at an offset angle to the second orientation. A detector is configured to provide an index signal responsive to an index mark being aligned with the detector. The system also includes means for rotating the encoder disk about the axis. The system also includes means for receiving a first index signal provided by the detector, and a second index signal provided by the detector after the first index signal. The system also includes means for determining an angle of rotation of the disk between receipt of the first index signal and receipt of the second index signal. The system also includes means for identifying a defect in the encoder disk based on the angle of rotation being different from the offset angle.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 3 is a block diagram of an example method, in accordance with at least some embodiments herein.

DETAILED DESCRIPTION

Figure 1:
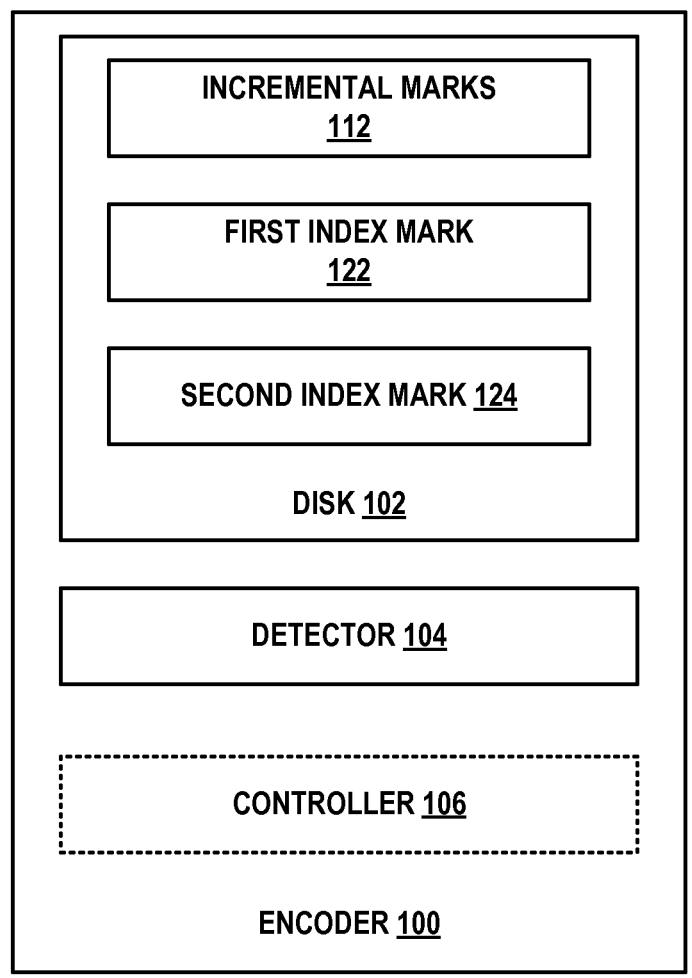
FIG. 1 is a simplified block diagram of an example encoder, in accordance with at least some embodiments herein.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein, for example.

Mechanical devices such as robotic devices, printers, industrial assembly lines, vehicles, etc., typically utilize an encoder to characterize the position or motion of a mechanical component of the device. As an example, a robotic device may be configured to move a hardware segment in a linear motion within a predefined range. In this example, the robotic device may include an incremental encoder coupled to the hardware segment to map each position of the segment with an encoder position (e.g., encoder value, bias, etc.). Typically, an incremental encoder outputs an index pulse for each complete rotation of an encoder disk and a plurality of incremental pulses for each pre-determined amount of rotation of the encoder disk. In turn, the robotic device associates the index pulse with a particular position of the segment, and every other position of the segment with a corresponding encoder position represented as a number of incremental pulses away from the index pulse.

However, in some scenarios, the robotic device fails to control the segment properly due to a defect in the encoder. In one scenario, the encoder may output false index pulses or false incremental pulses. In another scenario, the encoder may fail to output an index pulse or an incremental pulse as expected. The defects can have various causes such as encoder disk defects (e.g., scratches, dust, manufacture defects, defects occurring due to use over time, etc.), positional sensing defects (e.g., sensor defects, etc.), or any other defects (e.g., signaling defects, electrical defects, environmental sensitivity, interference, etc.). In any case, such defects cause the robotic device to determine an incorrect encoder position, and therefore also determine an incorrect mechanical position of the hardware segment.

Within examples, methods and systems are provided for identifying such encoder defects. In one example, an encoder is provided that includes a disk configured to rotate about an axis. The disk includes at least two index marks separated by a unique distance such that a first orientation of the disk that is associated with a first index mark is at a known offset angle to a second orientation of the disk that is associated with a second index mark. The encoder also includes a detector to output an index signal in response to an index mark being aligned with the detector. In response to a rotation of the disk about the axis, the encoder is configured to determine an angle of rotation of the disk between provision of a first index signal by the detector and provision of a second index signal by the detector after the first index signal. Further, the encoder is configured to identify a defect in the encoder by comparing the determined angle of rotation with the known offset angle. In line with the discussion above, various embodiments herein describe identifying different types of defects in greater detail.

Referring now to the Figures, FIG. 1 is a simplified block diagram of an example encoder 100, in accordance with at least some embodiments herein. As shown, the encoder 100 includes a disk 102 and a detector 104. In some examples, the encoder 100 also includes a controller 106.

The disk 102 is configured to rotate about an axis of the disk 102. As shown, the disk 102 includes a plurality of incremental marks 112, a first index mark 122, and a second index mark 124. In some examples, the disk 102 includes a solid material having a round shape that rotates in the center of the encoder 100. In other examples, the disk 102 is coupled to a rotary disk (not shown) of the encoder 100. For example, the disk 102 can be a sticker glued to such rotary disk. In some examples, the disk 102 includes multiple disks coupled to one another. For example, a first disk may include the incremental marks 112 and a second disk may include the index marks 122 and 124. Other examples are possible as well.

The plurality of incremental marks 112 are configured in a given arrangement such that adjacent marks of the incremental marks 112 are separated by a particular distance, or by slightly varying distances. In turn, the encoder 100 provides encoder values that each indicate a similar or same change in the encoder position of the encoder 100 (e.g., same change in the orientation of the disk 102) based on detection of the incremental marks 112. In some examples, the encoder 100 provides a particular encoder value (e.g., encoder position) based on detection of a particular incremental mark of the incremental marks 112.

The first index mark 122 is at a first location on the disk 102 associated with the disk 102 being at a first orientation about the axis. The second index mark 124 is at a second location on the disk associated with the disk 102 being at a second orientation about the axis. The first orientation is at a pre-determined offset angle to the second orientation. Thus, the encoder 100 provides an index signal based on detection of the first index mark 122 or the second index mark 124. For instance, the encoder 100 provides an index signal for every complete rotation of the disk 102 from the first orientation of the first index mark 122. Similarly, for instance, the encoder 100 may provide an index signal for every complete rotation of the disk 102 from the second orientation of the second index mark 124. Thus, for instance, the encoder 100 may provide two index signals for each complete rotation of the disk 102.

In some examples, the disk 102 includes additional index marks other than the index marks 122, 124. In these examples, adjacent index marks of the disk 102 are each separated by a unique distance, and respective orientations of the disk for each index mark are at unique offset angles to one another.

The marks 112, 122, 124 are configured according to an implementation of the encoder 100. In one example, where the encoder 100 is a mechanical encoder, the marks 112, 122, 124 are a set of concentric rings of openings in a solid disk or other type of disk (e.g., disk 102). In another example, where the encoder 100 is an optical encoder, the disk 102 is formed of a solid material, and the marks 112, 122, 124 are transparent or opaque areas of the disk 102. In yet another example, where the encoder 100 is a magnetic encoder, the marks 112, 122, 124 are a series of magnetic poles positioned along the disk 102. In still another example, where the encoder 100 is a capacitive encoder, the disk 102 is asymmetrical shaped to rotate within the encoder 100 and therefore adjust capacitance between two electrodes (e.g., asymmetry is the marks 112, 122, 124, etc.). Other implementations are possible as well. Further, in some embodiments, the disk 102 is implemented as several disks for different types of encoders that are combined in the encoder 100. In one example, a first disk including the incremental marks 112 is implemented similarly to a mechanical encoder, and a second disk including the first index mark 122 and the second index mark 124 is implemented similarly to a magnetic encoder. Other examples are possible as well.

The detector 104 includes any detector configured to detect the marks 112, 122, and/or 124 when one of the marks 112, 122, 124 is aligned with the detector 104. In some examples, the detector 104 provides an incremental signal in response to detecting one of the incremental marks 112. In turn, a particular change in the orientation of the disk 102 may be determined based on two consequent incremental signals provided by the detector 104. Further, in some examples, the detector 104 provides an index signal in response to detecting one of the index marks 122, 124. In turn, the encoder 100 determines an orientation of the disk 102 by determining an angle of rotation of the disk 102 between provision of a first index signal and a second subsequent index signal by the detector 104, and comparing the angle of rotation with the known offset angle between the index marks 122 and 124.

In some examples, the detector 104 includes a combination of detectors, where one detector (e.g., magnetic, etc.) detects the incremental marks 112 and another detector (e.g., optical) detects the index marks 122 and 124. In another embodiment, the detector 104 is a single detector that is configured to detect both the incremental marks 112 and the index marks 122, 124 while distinguishing the type of mark. By way of example, the encoder 100 in this embodiment outputs an encoder pulse or incremental signal (e.g., bias, value, etc.) that corresponds to any of the incremental marks 112 being aligned with the detector 104. Further, in this embodiment, the detector 104 outputs an index signal to indicate detection of any of the index marks 122 or 124.

The controller 106 includes one or more processors configured to operate the encoder 100. In one embodiment, the controller 106 receives incremental signals and/or index signals from the detector 104 to detect a rotation of the disk 102. In this embodiment, the encoder 100 is coupled to an external moveable component (not shown) such as a motor. For instance, the disk 102 may be coupled to the motor via a shaft and/or gears (not shown) to rotate responsive to rotation of the motor. In turn, the detector 104 in this embodiment outputs incremental signals when any of the incremental marks 112 is aligned with the detector 104, and the controller 106 detects the motion of the external component based on the received incremental signals. Alternatively or additionally, in another embodiment, the controller 106 rotates the disk 102 via an internal motor (not shown) to receive the signals from the detector 104.

In some embodiments, the controller 106 determines an orientation of the disk 102 based on received index signals from the detector 104. In an example scenario, the controller 106 receives a first index signal, a second index signal, and a particular number of incremental signals between the first index signal and the second index signal. In the scenario, the controller 106 determines that the particular number of incremental signals corresponds to the pre-determined offset angle between the first index mark 122 and the second index mark 124 when the disk 102 rotates in a clockwise direction. In turn, the controller 106 in the scenario determines that the orientation of the disk 102 when the second index signal was provided by the detector 104 corresponds to the second orientation associated with the second index mark 124. As a variation of the scenario, if the controller 106 determines that the particular number of incremental signals corresponds to a difference between a complete rotation and the pre-determined offset angle, the controller 106 then determines that the rotation of the disk 102 was in the anticlockwise direction, and therefore the orientation of the disk 102 corresponds to the first orientation of the first index mark 122 when the second index signal was provided by the detector 104. Other examples are possible as well and are described in greater detail within exemplary embodiments herein.

In some embodiments, the controller 106 identifies a defect in the encoder 100. In one embodiment, the detector 104 has a defect that causes the detector 104 to provide false index signals and/or false incremental signals (e.g., detector 104 sensitivity too high, detector 104 has a physical or electrical defect, etc.), or a defect that causes the detector 104 to fail to detect one or more of the marks 112, 122, 124. In one instance, the controller 106 identifies such defect by comparing the number of incremental signals received for a complete rotation of the disk 102 with an expected number of incremental signals. In another instance, the controller 106 identifies such defect by comparing an angle of rotation of the disk 102 between two index signals from the detector 104 with the pre-determined offset angle between the first index mark 122 and the second index mark 124. In another embodiment, the disk 102 has a defect (e.g., missing mark, scratch, dust, etc.) that causes the detector 104 to detect a false signal or fail to detect any of the marks 112, 122, 124. Similarly, the controller 106 detects such defect by comparing various angles of rotation of the disk 102 with an expected angle that is based on the pre-determined offset angle between the first index mark 122 and the second index mark 124. Other processes and defects are possible as well and are described in greater detail within exemplary embodiments herein.

In some embodiments, the controller 106 is alternatively included in an external computing device that is coupled to the encoder 100. In these embodiments, the functions described above for rotating the disk 102, identifying defects in the encoder 100, and/or determining the orientation of the disk 102 are performed by the external computing device.

Accordingly, in some embodiments, the encoder 100 includes more, fewer, or different components, and each component includes more, fewer, or different sub-components. Additionally, the components and sub-components shown can be combined or divided in any number of ways, and some components can be implemented in external devices coupled to the encoder 100.

Figure 2:
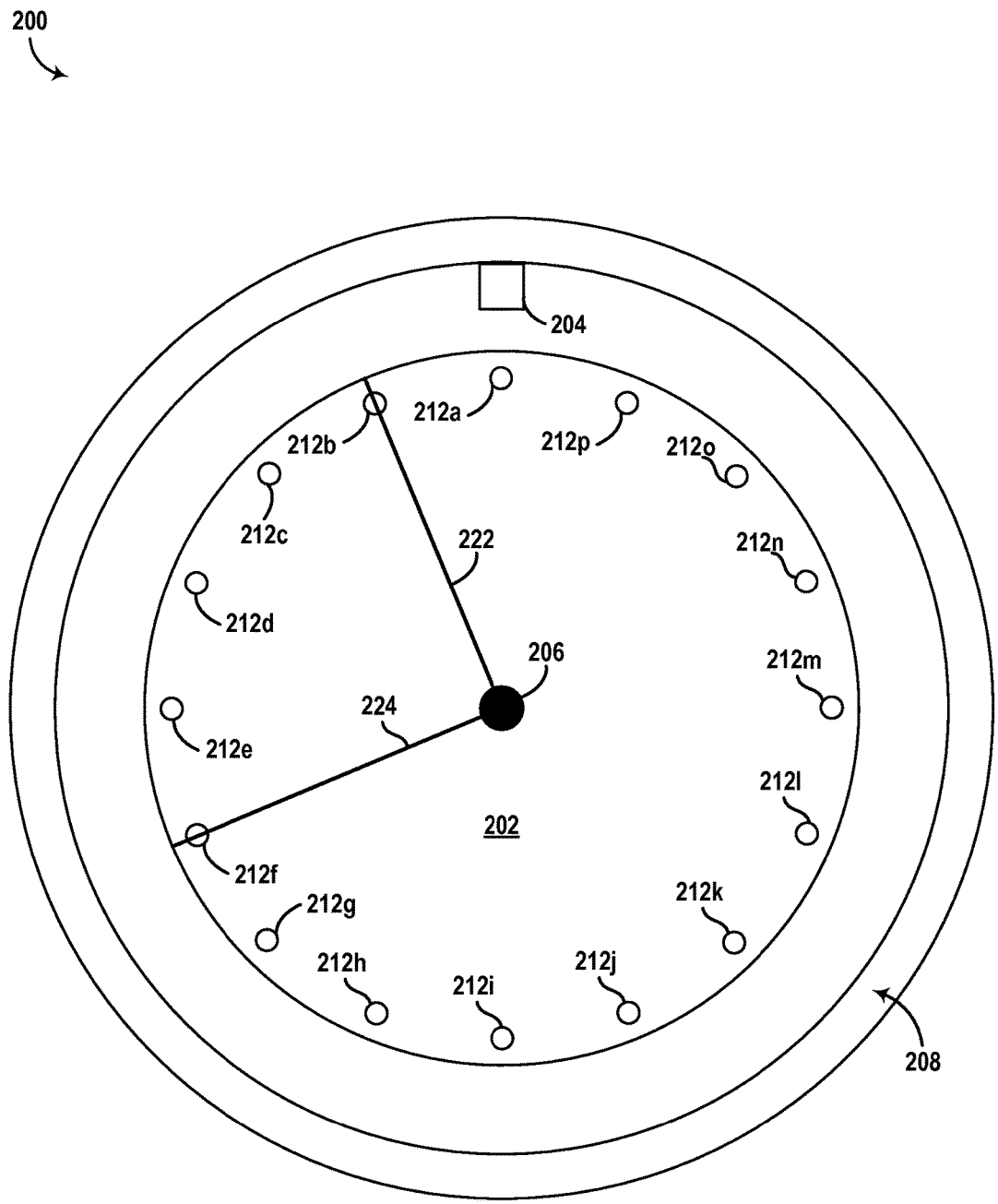
FIG. 2 illustrates an example encoder, in accordance with at least some embodiments herein.

FIG. 2 illustrates an example encoder 200, in accordance with at least some embodiments herein. In one example, the illustration in FIG. 2 corresponds to a cross-section view of an encoder such as the encoder 100 of FIG. 1. As shown, the encoder 200 includes a disk 202, a detector 204, a shaft 206, and a casing 208.

The disk 202 has a circular shape and is mounted to the shaft 206 to rotate about the shaft 206 (e.g., the axis of the disk 202). However, in some embodiments, the disk 202 has any other shape (e.g., elliptical, rectangular, hexagonal, triangular, etc.). Further, as shown, the disk 202 includes a plurality of incremental marks 212a-212p, a first index mark 222, and a second index mark 224 that are similar, respectively, to the incremental marks 112, the first mark 122, and the second mark 124 of the encoder 100. As shown, the marks 212a-212p are sixteen marks. However, in some embodiments, the marks 212a-212p include any other number of marks according to a configuration of the encoder 200. Further, in some embodiments, the encoder 200 includes more or fewer index marks than the two index marks 122, 124.

In some embodiments, the disk 202 is a single disk that includes both the incremental marks 212a-p and the index marks 222-224. In other embodiments, the disk 202 is formed from two separate disks that are coupled to one another. In one example, a first disk that includes the incremental marks 212a-212p is coupled to a second disk that includes the index marks 222-224. For instance, the second disk may be a sticker that is glued onto the first disk, among other possibilities.

Although FIG. 2 shows each of the index marks 222-224 overlapping with incremental marks (e.g., marks 212b and 212o), in some embodiments, the index marks 222-224 do not overlap with any incremental marks. In one embodiment, the index mark 222 is alternatively positioned between the incremental mark 212a and the incremental mark 212b. Other arrangements are possible as well.

The detector 204 includes any detector configured to detect the incremental marks 212a-212p when one of the incremental marks 212a-212p is aligned with the detector 204, similarly to the detector 104 of the encoder 100. As illustrated in FIG. 2, for example, the incremental mark 212a is aligned with the detector 204. In one example, where the encoder 200 is a mechanical encoder, the incremental marks 212a-212p are openings in a solid disk (e.g., the disk 202) and the detector 204 detects such openings (e.g., range sensor, etc.). In another example, where the encoder 200 is an optical encoder, the incremental marks 212a-212p are transparent/opaque/reflective areas of the disk 202, and the detector 204 is an optical detector (e.g., camera, light detector, etc.) that detects such areas. In yet another example, where the encoder 200 is a magnetic encoder, the incremental marks 212a-212p are magnetic poles and the detector 204 is a magnetic sensor (e.g., coil, etc.). In still another example, where the encoder 200 is a capacitive encoder, the incremental marks 212a-212p are asymmetrically shaped protrusions or ridges that adjust a capacitance between the detector 204 and the disk 202 (e.g., the detector 204 is a capacitive sensor). Other examples are possible as well.

Similarly, the detector 204 is configured to detect the index marks 222-224 that are formed similarly to the incremental marks 212a-212p. In one embodiment, the detector 204 includes a combination of detectors, where one detector (e.g., magnetic) detects the incremental marks 212a-212p and another detector (e.g., optical) detects the index marks 222-224. In another embodiment, the detector 204 is a single detector that is configured to detect both the incremental marks 212a-212p and the index marks 222-224 while distinguishing the type of mark. By way of example, the encoder 200 in this embodiment outputs an encoder pulse (e.g., bias, value, etc.) that corresponds to any of the incremental marks 212a-212p being aligned with the detector 204. Further, in this embodiment, the encoder 200 outputs an index signal to indicate that one of the index marks 222-224 is aligned with the detector 204. For example, in the illustration of FIG. 2, if the disk 202 rotates in a clockwise direction, the encoder 200 provides an index signal when the index mark 222 is aligned with the detector 204 and an encoder pulse as well to indicate detection of the deformation 212a being also aligned with the detector 204.

The shaft 206, for example, is a solid rod or other rigid component that extends at a first side out of the page to couple with an actuator (not shown) or any other moveable component that causes the shaft 206 to rotate. Further, in some examples, the shaft 206 extends at a second opposite side into the page to couple with another component such as a hardware segment. Alternatively, in some examples, both the actuator and the segment are deployed at the same side of the shaft 206, or additional components (e.g., gears, etc.) are coupled between the shaft 206 and the segment. In turn, the shaft 206 defines an axis of rotation for the disk 202, and the disk 202 rotates about the axis in response to rotation of the shaft 206.

The casing 208 is formed from any solid material configured to support the detector 204 in a particular location relative to the disk 202. In turn, the detector 204 remains at the particular location as the disk 202 rotates about the axis defined by the shaft 206. In some embodiments, the casing 208 and any other component of the encoder 200 alternatively has any shape other than the shapes shown in FIG. 2.

As shown, adjacent marks of the incremental marks 212a-212p are separated by a same or similar distance. Thus, for example, detection of two adjacent marks of the incremental marks 212a-212p by the detector 204 indicates that the encoder 200 rotated a given amount about its encoder axis (i.e., the shaft 206). Since the incremental marks 212a-212p are sixteen marks in the illustration of FIG. 2, the given amount is approximately $2\pi/16=\pi/8$ radians.

Moreover, as shown, the index marks 222 and 224 are separated by a unique distance. In FIG. 2, for example, the first index mark 222 is at a first location on the disk 202 that is aligned with the incremental mark 212b. The first location of the first index mark 222 is associated with the disk 202 being at a first orientation about the axis defined by the shaft 206. The first orientation corresponds to the first index mark 222 being aligned with the detector 204. For instance, the first orientation is achieved if the disk 202 in the illustration of FIG. 2 is rotated in the clockwise direction by an angle of rotation of $\pi/8$ radians to align the first index mark 222 with the detector 204. Similarly, in FIG. 2, the second index mark is at a second location on the disk 202 that is aligned with the incremental mark 212f, and the second location is associated with the disk 202 being at a second orientation about the axis (i.e., when the second index mark 224 is aligned with the detector 204). Further, the first orientation is at an offset angle to the second orientation. For instance, the offset angle for a rotation of the disk 202 in the clockwise direction from the first orientation where the first index mark 222 is aligned with the detector 204 to the second orientation where the second index mark 224 is aligned with the detector 204 is $4*(2\pi/16)=\pi/2$ radians (90°). In the anticlockwise direction, the offset angle is $2\pi-\pi/2=3\pi/2$ radians (270°). In turn, for example, detection of the two index marks 222-224 allows the encoder 200 (or a device that operates the encoder 200) to determine an exact encoder position of the encoder 500 (i.e., the orientation of the disk 202 about the shaft 206).

It is noted that the offset angle shown in FIG. 2 is for exemplary purposes only. Other offset angles are possible. For example, the index marks 222 and 224 may be alternatively located to overlap with any other incremental mark of the incremental marks 212a-212p, and may be separated by any number of incremental marks, among other possibilities.

FIG. 3 is a block diagram of an example method 300, in accordance with at least some embodiments herein. Method 300 shown in FIG. 3 presents an embodiment of a method that could be used the encoders 100 or 200, for example. Method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

An example scenario for the operation of the encoder 200 of FIG. 2 according to the method 300 is as follows. In the scenario, the encoder 200 (or a computing device that operates the encoder 200) is unaware of a current encoder position of the encoder 200 (i.e., the orientation of the disk 202 about the shaft 206). For instance, in the scenario, the encoder 200 is at an initial state (e.g., start-up state, uncalibrated state, etc.) where the encoder 200 is at an unknown initial configuration.

At block 302, the method 300 includes receiving a first index signal provided by a detector (e.g., detector 204). Continuing with the scenario, the first index signal is received at block 302 in response to rotation of the disk 202 about the shaft 206 in a clockwise direction. Suppose that, in the scenario, the shaft 206 is coupled to a mechanical component and configured to rotate as the mechanical component is moved. In turn, the disk 202 responsively rotates as well. As the disk 202 rotates, the detector 204 becomes aligned with the index mark 222, and thus provides the first index signal that is received at block 302. In one embodiment, the first index signal is received by a controller of an encoder (e.g., controller 106 of the encoder 100). In another embodiment, the first index signal is received by a computing device that operates the encoder.

At block 304, the method 300 involves receiving a second index signal provided by the detector after the first index signal. Continuing with the scenario, the disk 202 continues to rotate in the clockwise direction until the index mark 224 becomes aligned with the detector 204. In turn, the detector 204 provides the second index signal described at block 304.

At block 306, the method 300 involves determining an angle of rotation of an encoder disk between provision of the first index signal by the detector and provision of the second index signal by the detector. In some embodiments, the angle of rotation is determined via an external sensor such as an IR ranging sensor or any other sensor that monitors the encoder disk. In other embodiments, the method 300 determines the angle of rotation based on incremental signals received from the detector. In these embodiments, the encoder disk includes a plurality of incremental marks similar to the marks 212a-212p of the encoder 200.

Accordingly, in some examples, the method 300 also involves receiving a plurality of incremental signals provided by the detector between the first index signal and the second index signal, and determining the angle of rotation based on a quantity of the plurality of incremental signals.

Continuing with the scenario above by way of example, a device of the method 300 keeps track of detected marks of the incremental marks 212a-212p and/or the index marks 222-224. By way of example, the encoder 200 sets a counter that counts the number of detected incremental marks 212a-212p from the current configuration shown in FIG. 2 to zero. As the encoder 200 rotates in the clockwise direction about the shaft 206, the detector 204 first detects the marks 212b and 222 after rotating by one encoder tick (i.e., π/8 radians). In turn, the device of the method 300 receives an incremental signal from the detector 204 of the encoder 200 indicating detection of the incremental mark 212b and updates the counter value to one. Further, the device of the method 300 receives a first index signal from the detector 204, as described at block 302, indicating detection of the index mark 222, and the method 300 thus associates the counter value of one with a location of an index mark.

At this point in the scenario, the device of the method 300 still does not know which index mark of the index marks 222-224 caused the first index signal. Next, the encoder 200 continues rotation in the clockwise direction by another encoder tick (i.e., π/8 radians). Similarly, the detector 204 provides another incremental signal to indicate detecting the incremental mark 212c. In turn, the device of the method 300 updates the counter value to 2. Similarly, the detector 204 outputs incremental signals for the incremental marks 212d, 212e and 212f. In the scenario, when the disk 202 is aligned with the incremental mark 212f, the detector 204 also detects the index mark 224 and therefore outputs a second index signal, as described at block 304, which is associated with the counter value 5. At this point in the scenario, the method 300 determines the angle of rotation at block 306 based on the counter values. For instance, the method 300 received four incremental signals (5−1=4 counter values) between the first index signal and the second index signal. Thus, for example, the angle of rotation is determined by the method 300 as 4*π/8=π/2 radians.

At block 308, the method 300 involves providing an output indicative of an orientation of the encoder disk. Continuing with the example scenario, the device of the method 300 determines that the orientation of the disk 202 when the second index signal was provided is the second orientation of the second index mark 224 because the angle of rotation of π/2 radians is only possible with a counter-clockwise rotation of the disk 202 from the first orientation of the first index mark 222 to the second orientation of the second index mark 224.

However, in some scenarios, the angle of rotation determined at block 306 is different from the offset angle between the two index marks. Accordingly, in some embodiments, the method 300 also involves identifying a defect in the encoder based on the offset angle being different from the angle of rotation.

In some scenarios, the encoder defect is due to a defective detector. By way of example, a detector may output false signals or fail to output correct signals due to a physical, electrical, or other defect in the detector. In other scenarios, the encoder defect is due to a defect in the encoder disk. In one instance, the defect is due to a scratch or dust on the disk that the detector incorrectly detects as an index mark or as an incremental mark. In another instance, the defect is a manufacturing defect. For example, one or more of the marks 212a-212p, 222-224 of the encoder 200 may be missing, or incorrectly formed. As an example where the encoder is a magnetic encoder and the marks are magnetic poles on the disk, a magnetic pole may not have a sufficient magnetic field to be detected by the detector. Alternatively or additionally, for example, one or more extra marks may be incorrectly positioned on the disk. Other defects are possible as well, such as defects in transmission or processing of signals from the detector, among other possibilities. Accordingly, exemplary embodiments herein include devices and methods for identifying such defects.

Figure 4:
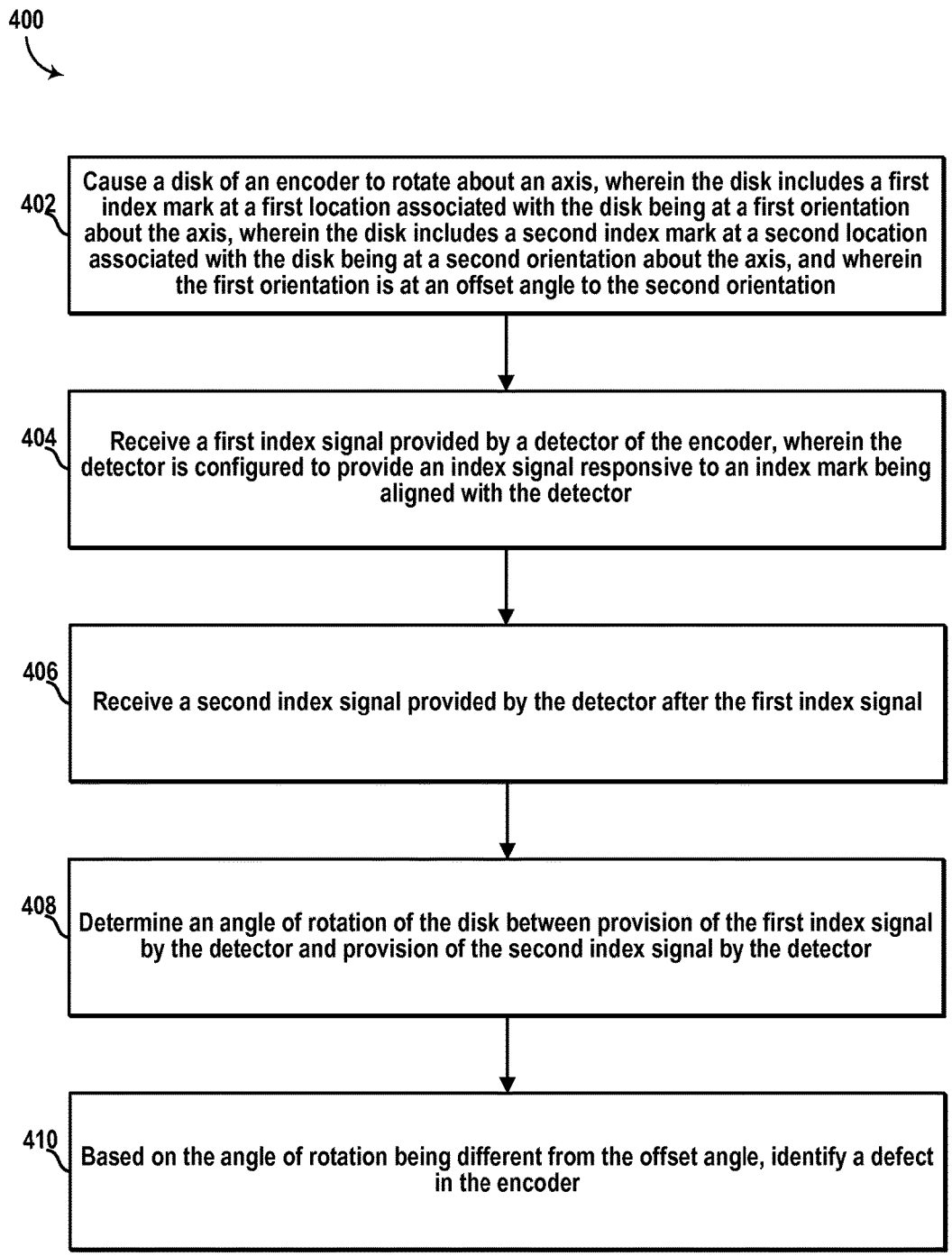
FIG. 4 is a block diagram of another example method, in accordance with at least some embodiments herein.

FIG. 4 is a block diagram of another method 400, according to an example embodiment. Method 400 shown in FIG. 4 presents an embodiment of a method that could be used with the encoders 100 and/or 200, for example. Method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 402, the method 400 involves causing a disk of an encoder to rotate about an axis. The disk includes a first index mark at a first location associated with the disk being at a first orientation about the axis. The disk includes a second index mark at a second location associated with the disk being at a second orientation about the axis. The first orientation is at an offset angle to the second orientation. In one embodiment, a computing device communicatively coupled with the encoder provides instructions that cause the disk to rotate. In another embodiment, a controller of the encoder (e.g. controller 106 of the encoder 100) operates the disk to cause the disk to rotate about the axis. The first index mark and the second index mark are similar, respectively, to the first index mark 222 and the second index mark 224 of the encoder 200.

At block 404, the method 400 involves receiving a first index signal provided by a detector of the encoder. The detector is configured to provide an index signal responsive to an index mark being aligned with the detector. The detector and the first index signal are received similarly to the detector and the first index signal at block 302 of the method 300.

At block 406, the method 400 involves receiving a second index signal provided by the detector after the first index signal, similarly to block 304 of the method 300.

At block 408, the method 400 involves determining an angle of rotation of the disk between provision of the first index signal by the detector and provision of the second index signal by the detector. In one embodiment, determining the angle of rotation is based on another positional sensor monitoring the disk. In another embodiment, similarly to block 306 of the method 300, determining the angle of rotation is based on incremental signals provided by the detector responsive to alignment of one or more incremental marks on the disk (e.g., incremental marks 112) with the detector between the first index signal and the second signal.

Accordingly, in some embodiments, the method 400 also involves receiving a plurality of incremental signals provided by the detector between the first index signal and the second index signal. In these embodiments, the disk includes a plurality of incremental marks, and adjacent marks of the plurality of incremental marks are separated by a particular distance (e.g., incremental marks 212a-212p of the encoder 200, etc.). Further, in these embodiments, the detector provides an incremental signal responsive to one of the plurality of incremental marks being aligned with the detector. In these embodiments, determining the angle of rotation at block 408 is based on a quantity of the plurality of incremental signals, in line with the discussion for the block 306 of the method 300.

In some embodiments, the method 400 also involves determining an orientation of the disk about the axis based on the angle of rotation being equal to the offset angle, similarly to block 308 of the method 300.

At block 410, the method 400 involves identifying a defect in the encoder based on the angle of rotation being different from the offset angle. Various defects are possible that cause a discrepancy between the determined angle of rotation and the known offset angle. The defects may include false signals provided by the encoder, failure of the encoder to detect an index mark or an incremental, or failure of the encoder to provide a signal. A non-exhaustive list of scenarios is presented below along with exemplary embodiments for further identification and classification of the various possible defects.

In a first example scenario, the defect is due to a failure in detecting one or both of the index marks. In this scenario, the angle of rotation determined at block 408 may correspond to a complete rotation. Referring back to FIG. 2 by way of example, the detector 204 in this scenario fails to output an index signal for the index mark 224. The failure in this scenario is due to a defect in the detector 204 or a defect in the disk 202 (e.g., missing mark, etc.). In turn, the encoder 200 in this scenario detects only the index mark 222 for each complete rotation of the disk 202, and thus the first index signal and the second index signal are due to detection of the index mark 222. In turn, in this scenario, the determined angle of rotation at block 408 (e.g., $2\pi$ radians) is greater than the offset angle between the index marks 222 and 224 (e.g., $\pi/2$ radians) which triggers identifying the defect at block 410. Further, in this scenario, the method 400 identifies the defect as a failure to detect one or more of the first index mark or the second index mark.

Accordingly, in some embodiments, the method 400 also involves identifying the defect as a failure to detect one or more of the first index mark or the second index mark based on the angle of rotation corresponding to a complete rotation of the disk about the axis.

In a second scenario, the defect is due to a false index signal provided by the detector. In one instance, the false index signal is due to a detector defect that causes the detector to provide false index signals intermittently, periodically, or in any other fashion. In another instance, the false index signal is due to a deformation on the disk such as a scratch, incorrect mark, dust, or any other deformation (e.g., deformations caused by use of the encoder over time, etc.).

Accordingly, in one embodiment, the method 400 also involves receiving a third index signal after the second index signal. The third index signal is received in response to further rotation of the disk after the second index signal is provided by the detector. In this embodiment, the method 400 also involves determining a second angle of rotation of the disk between provision of the second index signal by the detector and provision of the third index signal by the detector. Thus, for example, the angle of rotation between receipt of the first index signal and receipt of the second index signal is a first angle of rotation, and the second angle of rotation is between receipt of the second index signal and receipt of the third index signal. Further, in this embodiment, the method 400 also involves identifying the defect based also on the second angle of rotation.

By way of example, consider a scenario where the encoder 200 of FIG. 2 is configured to rotate in a counterclockwise direction. However, in this example, a scratch in the disk 202 (not shown) is located at or close to the mark 212*m*. In turn, the detector 204 in this example incorrectly detects the scratch as an index mark and outputs the first index signal. Next, the disk 202 continues to rotate until the index mark 224 is aligned with the detector 204. In turn, the detector 204 outputs the second index signal. Thus, in this example, the first angle of rotation (i.e., between mark 212*m* and index mark 224) is $7*\pi/8=7\pi/8$ radians, which is different from the expected offset angle of $3/2$ radians from the first index mark to the second index mark and different from the expected offset angle of $\pi/2$ radians from the second index mark to the first index mark. In turn, the method 400 identifies the defect at block 410. Next, the disk 202 continues to rotate counterclockwise until the index mark 222 is aligned with the detector 204. In turn, the detector 204 outputs the third index signal. Thus, in this example, the second angle of rotation (i.e., between mark 224 and mark 222) is $\pi/2$ radians which is equal to the offset angle for a counterclockwise rotation from the second index mark 224 to the first index mark 222.

Accordingly, in some embodiments, the method 400 also involves determining that the first index signal (e.g., due to scratch at 212*m* in the example above) is a false index signal based on the offset angle being equal to the second angle of rotation.

As a variation of the scenario in the example above, suppose that the scratch is alternatively located at the location of the mark 212*d*. In this example, the first index signal is due to the index mark 224, the second index signal is due to the scratch at mark 212*d*, and the third index signal is due to the index mark 222. In turn, the first angle of rotation (i.e., between mark 224 and mark 212*d*) is $2*\pi/8=\pi/4$ radians which is different from the expected offset angle of $3\pi/2$ radians (or $3\pi/2$ radians), thereby causing the method 400 to identify the defect at block 410. Further, the second angle of rotation (i.e., between mark 212*d* and mark 222) is also $\pi/4$ radians which is also different from the offset angle. However, a sum of the first angle of rotation and the second angle of rotation is $\pi/4+\pi/4=\pi/2$ radians which corresponds to the offset angle for a counterclockwise rotation from the index mark 224 to the index mark 222. In turn, the false index signal must be the second index signal associated with the scratch located at mark 212*d*.

Accordingly, in some embodiments, the method 400 also involves determining that the second index signal (e.g., due to the scratch at 212*d* in the example above) is a false index signal based on the offset angle being equal to a sum of the first angle of rotation and the second angle of rotation.

In the examples above, the false index signal was due to a deformation (e.g., scratch) on the surface of the disk. However, in some instances, the false index signal is due to a defect in the detector or other electronic component rather than the deformation at a particular location. Accordingly, in some embodiments, the present method allows confirming that the false index signal is due to a deformation.

In one embodiment, the method 400 also involves identifying a given orientation of the disk that is associated with the false index signal. In this embodiment, the method 400 also involves receiving another false index signal responsive to a complete rotation of the disk after provision of the false index signal by the detector. Further, in this embodiment, the method 400 also involves responsively identifying the defect as a deformation on the disk that is aligned with the detector based on the disk being at the given orientation.

By way of example, consider the scenario above where a scratch is located at mark 212*d*. In the scenario, the given orientation corresponds to an orientation of the disk 202 about the shaft 206 when the deformation (i.e., scratch at mark 212*d*) is aligned with the detector 204. Next, in the scenario, the disk 202 continues to rotate in the counterclockwise direction for a complete rotation until the scratch located at mark 212*d* is aligned again with the detector 204 (i.e., the disk 202 is again at the given orientation), and the detector 204 outputs the other false index signal. In turn, the method 400 in this scenario identifies the defect as a deformation on the disk 202 that is located at a given position associated with the disk 202 being at the given orientation when the mark 212*d* is aligned with the detector 204.

In some embodiments where the disk includes a plurality of incremental marks similar to the incremental marks 212*a*-212*p* of the encoder 200, identifying the defect at block 410 comprises determining that a number of incremental signals provided by the detector for a complete rotation of the disk is different from a number of the plurality of marks. For instance, the difference could be due to a false incremental signal or a failure to detect an incremental signal. In one embodiment, the angle of rotation between the two index signals determined at block 408 may only differ by one or few multiples of the angle between two index marks (e.g., $\pi/8$ in FIG. 2), and the method 400 may perform the determination based on detecting the minor difference.

In another embodiment, the method 400 performs additional processing of signals from the encoder to perform the determination. In this embodiment, the method 400 also involves receiving a third index signal provided by the detector after the second index signal. For example, the third index signal may be responsive to further rotation of the disk about the axis after the second index signal is received. Further, in this embodiment, the method 400 also involves receiving a second plurality of incremental signals provided by the detector between the second index signal and the third index signal. Thus, for example, the plurality of incremental signals between the first index signal and the second index signal is a first plurality of incremental signals, and the second plurality of incremental signals is between the second index signal and the third index signal. Further, in this embodiment, the method 400 also involves determining an expected number of incremental signals that corresponds to a complete rotation of the disk. Referring back to FIG. 2 by way of example, the expected number of incremental signals corresponds to sixteen (i.e., the number of incremental marks 212*a*-*p*). Further, in this embodiment, the method 400 also involves determining a sum of the quantity of the first plurality of incremental signals and a quantity of the second plurality of incremental signals. In this embodiment, the method 400 also involves identifying the defect as the detector providing false incremental signals based on the sum being greater than the expected number of incremental signals. Further, in this embodiment, the method 400 also involves identifying the defect as a failure to detect one or more of the plurality of incremental marks based on the sum being less than the expected number of incremental signals.

As an example scenario for this embodiment, consider a scenario where the encoder 200 is configured as shown in FIG. 2. In the scenario, the disk 202 rotates in the clockwise direction, and the detector 204 provides the first index signal when the mark 222 is aligned with the detector 204. Next, the detector 204 provides the first plurality of incremental signals (after the first index signal (e.g., for the incremental marks 212c, 212d, 212e, 212f in that order). Next, the detector 204 provides the second index signal in response to detection of the mark 224. Next, the detector 204 provides the second plurality of incremental signals after the second index signal (e.g., for the incremental marks 212g, 212h, 212i, 212j, 212k, 212l, 212m, 212n, 212o, 212p, 212a, 212b in that order). On one hand, in this scenario, if the sum of the first plurality of incremental signals and the second plurality of incremental signals is greater than sixteen (i.e., the expected number of incremental signals), the method 400 identifies the defect as the detector providing one or more false incremental signals. On the other hand, in this scenario, if the sum is less than sixteen, the method 400 identifies the defect as a failure to detect one or more of the plurality of incremental marks.

Figure 5:
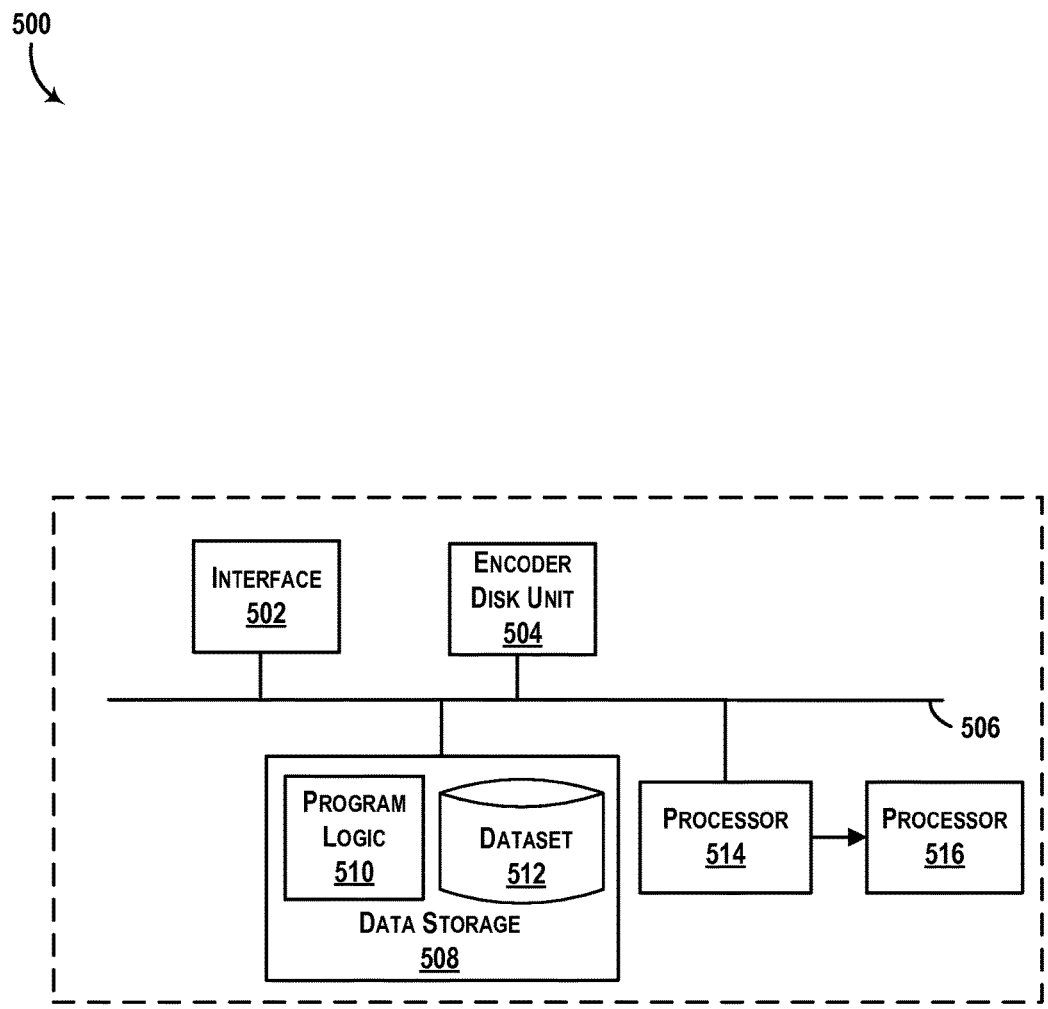
FIG. 5 is a block diagram of an example computing device, in accordance with at least some embodiments herein.

FIG. 5 is a block diagram of an example computing device 500, in accordance with at least some embodiments herein. In some embodiments, the computing device 500 is configured to operate at least some components of the encoders 100 and/or 200, in accordance with methods and process herein such as the methods 300 and/or 400. In one embodiment, the computing device 500 corresponds to the controller 106 of the encoder 100. In another embodiment, the computing device 500 is configured to assist operation of any of the encoders 100-200. For example, the computing device 500 may be an external computing device that provides instructions to operate the encoders 100, 200 and/or receives signals from the encoders 100, 200 in accordance with the methods 300, 400. In yet another embodiment, the computing device 500 is a computing device configured to manufacture encoder disks such as the disks 102, 202 of the encoders 100, 200. For example, the device 500 may generate an encoder disk by placing incremental marks and/or index marks in line with the discussion above. Other examples are possible as well.

In some examples, some components illustrated in FIG. 5 are distributed across multiple computing devices (e.g., desktop computers, servers, hand-held devices, etc.). In other examples, as shown, the components are part of one example device 500.

The device 500 includes an interface 502, an encoder unit 504, data storage 508, and a processor 514. Components illustrated in FIG. 5 are linked together by a communication link 506. In some examples, the device 500 includes hardware to enable communication within the device 500 and between the device 500 and another computing device (not shown), such as the encoders 100, 200. Example hardware includes transmitters, receivers, antennas, and/or wiring.

The interface 502 is configured to allow the device 500 to communicate with another device (not shown), such as an encoder, or with a user of the device 500, for example. Thus, the interface 502 is configured to receive input data (e.g., incremental signals, index signals, etc.) from one or more devices (or users), and is also configured to send output data to the one or more devices. In some examples, the interface 502 also maintains and manages records of data received and sent by the device 500. In other examples, records of data are maintained and managed by other components of the device 500. In some examples, the interface 502 also includes a receiver and transmitter to receive and send data. In some examples, the interface 502 also includes a user-interface, such as a keyboard, microphone, touch screen, etc., to receive inputs as well. Further, in some examples, the interface 502 also includes an interface with output devices such as a display, speaker, etc. Further, in some examples, the interface 502 includes wired communication components (e.g., USB ports, parallel ports, Ethernet interface, etc.) or wireless communication components (e.g., WiFi interface, Bluetooth interface, etc.).

The encoder disk unit 504 is configured to allow the device 500 to control or interact with an encoder such as the encoders 100-200. In one example, the encoder disk unit 504 rotates an encoder disk or provides instructions to an encoder to rotate an encoder disk. Thus, in some examples, the encoder disk unit 504 includes one or more mounts for mounting one or more encoder disks. Further, in some examples, the encoder disk unit 504 includes a detector similar to the detector 204 for detecting marks on an encoder disk. Thus, in some embodiments, the device 500 is configured to form index marks and/or incremental marks on an encoder disk via the encoder disk unit 504, or to test an encoder disk for defects, among other possibilities. In another example, the encoder disk unit 504 receives incremental signals or index signals from a detector of an encoder (e.g., detector 204 of encoder 200, etc.). Other examples are possible as well.

The processor 514 is configured to operate the device 500. In one example, the processor 514 is configured to cause the device 500 to provide a request to a robotic device for actuating a mechanical component until an encoder position of an encoder coupled to the mechanical component corresponds to a particular value. Further, in some examples, the processor 514 is also configured to operate other components of the device 500 such as input/output components or communication components. The device 500 is illustrated to include an additional processor 516. In some examples, the processor 516 configured to control some of the aspects described for the processor 514. In one example, the processor 514 is a controller that operates the interface 502, and the processor 616 is configured to control other aspects such as the data storage 508. However, some embodiments may include only one processor (e.g., processor 514) or may include additional processors configured to control various aspects of the device 500.

The communication link 506 is illustrated as a wired connection; however, wireless connections may also be used. In one example, the communication link 506 is a wired serial bus such as a universal serial bus or a parallel bus, or a wireless connection using, e.g., short-range wireless radio technology, communication protocols described in IEEE 802.11 (including any IEEE 802.11 revisions), or cellular wireless technology, among other possibilities.

The data storage 508 stores program logic 510 that can be accessed and executed by the processor 514 and/or processor 516. In one example, the program logic 510 includes instructions for any of the functions described herein for the encoders 100, 200, or any component thereof.

In another example, the program logic 510 includes any of the functions described herein for the methods 300, 400, and/or other process herein.

As shown, data storage 508 also stores dataset 512 that includes any data pertaining to the device 500 or components thereof. In some examples, the dataset 512 includes data pertaining to external devices in communication with the device 500. In one example, the dataset 512 includes offset angles between two index marks of an encoder disk. In another example, the dataset 512 includes statistical data such as deformation positions in a plurality of encoder disks, among other possibilities.

Figure 6:
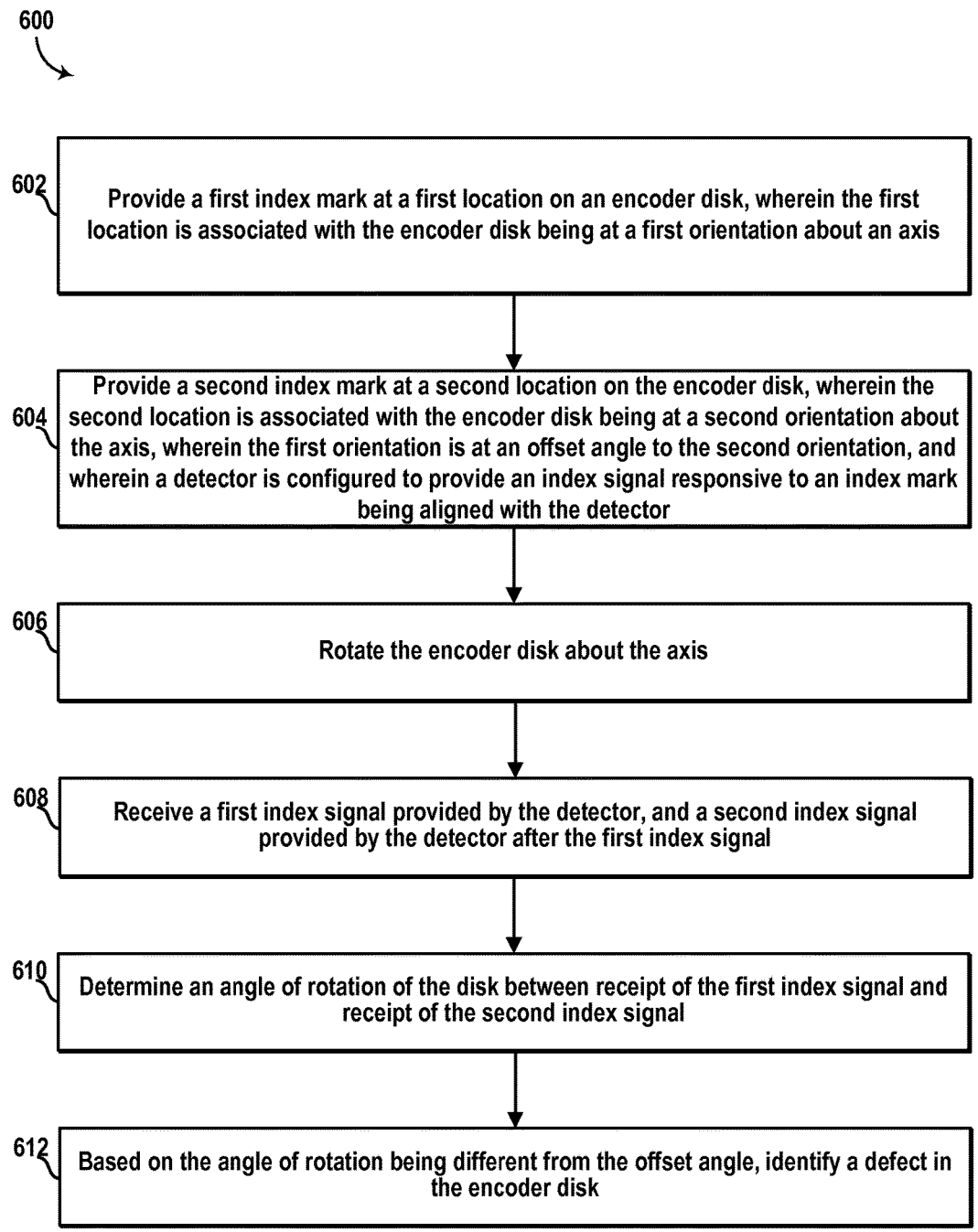
FIG. 6 is a block diagram of yet another example method, in accordance with at least some embodiments herein.

FIG. 6 is a block diagram of yet another example method 600, in accordance with at least some embodiments herein. Method 600 shown in FIG. 6 presents an embodiment of a method that could be used with the encoders 100, 200, and the device 500, for example. Method 600 may include one or more operations, functions, or actions as illustrated by one or more of blocks 602-612. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In some examples, the method 600 provides a mechanism for manufacturing or testing an encoder such as the encoders 100-200 for defects in line with the discussion above. In these examples, the method 600 is performed by a computing device that includes one or more processors, such as the device 500.

At block 602, the method 600 involves providing a first index mark at a first location on an encoder disk. The first location is associated with the encoder disk being at a first orientation about an axis.

At block 604, the method 600 involves providing a second index mark at a second location on the encoder disk. The second location is associated with the encoder disk being at a second orientation about the axis. The first orientation is at an offset angle to the second orientation. A detector is configured to provide an index signal responsive to an index mark being aligned with the detector.

Referring back to FIG. 2 by way of example, the encoder disk, the first index mark, and the second index mark at blocks 602-604 are similar, respectively, to the disk 202, the index mark 222, and the index mark 224 of the encoder 200. In some examples, the detector at block 604 is similar to the detector 204 of the encoder 200. In other examples, the detector at block 604 is a separate sensor mounted to a computing device performing the method 600. For example, the detector may be included in the encoder disk unit 504 of the device 500, among other possibilities.

Various implementations are possible for positioning the index marks at blocks 602-604. In one example, a computing device performing the method 600 includes a hardware interface, such as the encoder disk unit 504 of the device 500, to physically form the first index mark and the second mark at the offset angle (e.g., selected by the computing device or by a user). Referring back to FIG. 2 by way of example, the first index mark 222 and the second index mark 224 have the offset angle of $\pi/2$ radians between the two marks. Thus, for instance, the computing device may place a mark such as a printed shape on a sticker, a magnetic pole on a disk, a drilled hole on a disk, or any other mark in line with the description of the marks 222-224 of the encoder 200. In another example, the computing device includes a design interface (e.g., Computer Aided Design Software, etc.) that allows a user to position the first index mark and the second index mark, or to select the offset angle. In this example, data from the computing device is provided to another manufacturing system to form the index marks based on the user selections. Other examples are possible as well.

Although the offset angle shown in the encoder 200 is $\pi/2$ radians, other offset angles are possible as well.

On one hand, increasing the offset angle increases the likelihood of incorrectly associating a false or missing incremental signal with the presence of a deformation on the disk or detection of a false index signal. Referring back to FIG. 2 by way of example, consider a scenario where the index mark 224 is alternatively located at the location of the incremental mark 212j. In this scenario, more incremental marks are located between the two index marks. In turn, the likelihood that the difference between the angle of rotation and the offset angle is due to a false or missing incremental signal also increases.

On the other hand, reducing the offset angle reduces the likelihood of a deformation (e.g., scratch, dust, etc.) existing between the two index marks, and thus the likelihood of detecting the false index signal. Referring back to FIG. 2 by way of example, consider a scenario where the index mark 224 is alternatively located at the location of the incremental mark 212c. In this scenario, if a deformation is located between the two index marks (e.g., between marks 212b and 212c), the deformation would still cause a false index signal that is not identified as a defect. Instead, the false index signal would be incorrectly considered the second index signal associated with the second index mark 224 being aligned with the detector 204. Thus, in some examples, the offset angle is selected from a range of angles to increase the likelihood of a deformation being within a region of the disk between the two index marks, while also reducing the number of incremental marks between the two index marks. In one embodiment, the offset angle is selected from within a range of angles less than $\pi/3$ radians and greater than $\pi/6$ radians (e.g., $\pi/4$ radians=45°, etc.). However, other offset angles are possible as well.

Further, in some embodiments, the method 600 involves determining a likelihood that the encoder disk includes a deformation within a region of the encoder disk between the first index mark and the second index mark. For example, the deformation (e.g., dust, scratch, etc.) causes the detector to provide a false index signal. In these embodiments, the method 600 also involves selecting the offset angle such that the likelihood is within a threshold range (e.g., between 70% and 90%, or any other range). In these embodiments, positioning the first index mark at block 602 and the second index mark at block 604 is based on the selected offset angle.

In some examples, the method 600 determines the likelihood by statistically analyzing a plurality of encoder disks. By way of example, multiple encoder disks (e.g., used, new, etc.) are tested by a computing device such as the device 500 that is configured to perform the method 600 to determine an optimal offset angle in line with the discussion above.

Accordingly, in some embodiments, the method 600 also involves rotating a plurality of encoder disks about axes of the plurality of encoder disks. The plurality of encoder disks are associated with one or more detectors that provide signals responsive to the one or more detectors being aligned with one or more deformations on the plurality of encoder disks. In these embodiments, the method 600 also involves determining a statistical relationship between presence of a given deformation within a given region of a given encoder disk and a size of the given region. Further, in these embodiments, determining the likelihood is based on the statistical relationship. For example, consider a scenario where, on average, an encoder disk includes four deformations. In this scenario, the statistical relationship may indicate that a deformation existed, on average, every $\pi/2$ radians of encoder disk rotation, and therefore the offset angle may be selected as $\pi/2$ radians.

In some embodiments, the method 600 also involves positioning one or more additional index marks on the encoder disk. In these embodiments, adjacent index marks on the disk are each separated by a unique distance, such that offset angles between respective orientations of the index marks are also unique.

However, a number of the index marks on the encoder disk may affect the ability of the computing device to identify defects. Referring back to FIG. 2 by way of example, the two index marks 222 and 224 are separated by an offset angle of $\pi/2$ radians. Consider an example scenario where a deformation (e.g., scratch) is located at or close to mark 212$n$ or mark 212$j$. In both cases, the offset angle between such deformation and the nearest index mark is also $\pi/2$ radians. Thus, in this scenario, the computing device of the method 600 may not be suitable for identifying those two defects. As a variation of this scenario, suppose that the encoder 200 includes another index mark at or close to mark 212$k$. In this scenario, additional locations for possible deformations may also be unidentified by the method 600. For example, the mark 212$k$ is at $5\pi/16$ radians from the index mark 224 and $7\pi/16$ radians to the index mark 222. However, marks 212$a$, 212$m$, 212$o$, and 212$h$ are also at these offset angles. Thus, in this scenario, six locations on the disk may include deformations (i.e., defects) that the method 600 is not suitable to detect.

Accordingly, in some embodiments, the method 600 also involves selecting offset angles for a plurality of index marks on the disk and a number of the plurality of index marks based on a likelihood that the encoder disk includes one or more deformations within one or more regions of the disk between adjacent marks of the plurality of marks. Additionally or alternatively, in some embodiments, the selection is based on the statistical relationship between presence of a given deformation within a given region of a given encoder disk and a size of the given region, in line with the discussion above.

At block 606, the method 600 involves rotating the encoder disk about the axis. In one example, a computing device such as the device 500 may rotate an encoder disk mounted to the encoder disk unit 504. In another example, an external computing device performing the method 600 operates an encoder such as the encoder 200 to rotate the disk 202 about the shaft 206. In yet another example, the computing device provides instructions to a controller of an encoder such as the controller 106 of the encoder 100 to rotate the encoder disk. Other examples are possible as well in line with the discussion above.

At block 608, the method 600 involves receiving a first index signal provided by the detector, and a second index signal provided by the detector after the first index signal, similarly to blocks 302-304 of the method 300.

At block 610, the method 600 involves determining an angle of rotation of the disk between receipt of the first index signal and receipt of the second index signal, similarly to block 306 of the method 300 and/or block 408 of the method 400.

At block 612, the method 600 involves identifying a defect in the encoder disk based on the angle of rotation being different from the offset angle, similarly to block 410 of the method 400. Thus, in some examples, the method 600 may allow manufacture and/or testing of an encoder disk for defects, such as the encoder disks 102, 202 of the encoders 100, 200. For instance, a computing device performing the method 600 may position the index marks at blocks 602-604, rotate the encoder disk at block 606, and identify any manufacturing defects (e.g., scratches, dust, undetectable mark, misplaced mark, etc.) that cause false index signals, false incremental signals, failures to detect a mark, etc., in line with the discussion above.

Figure 7:
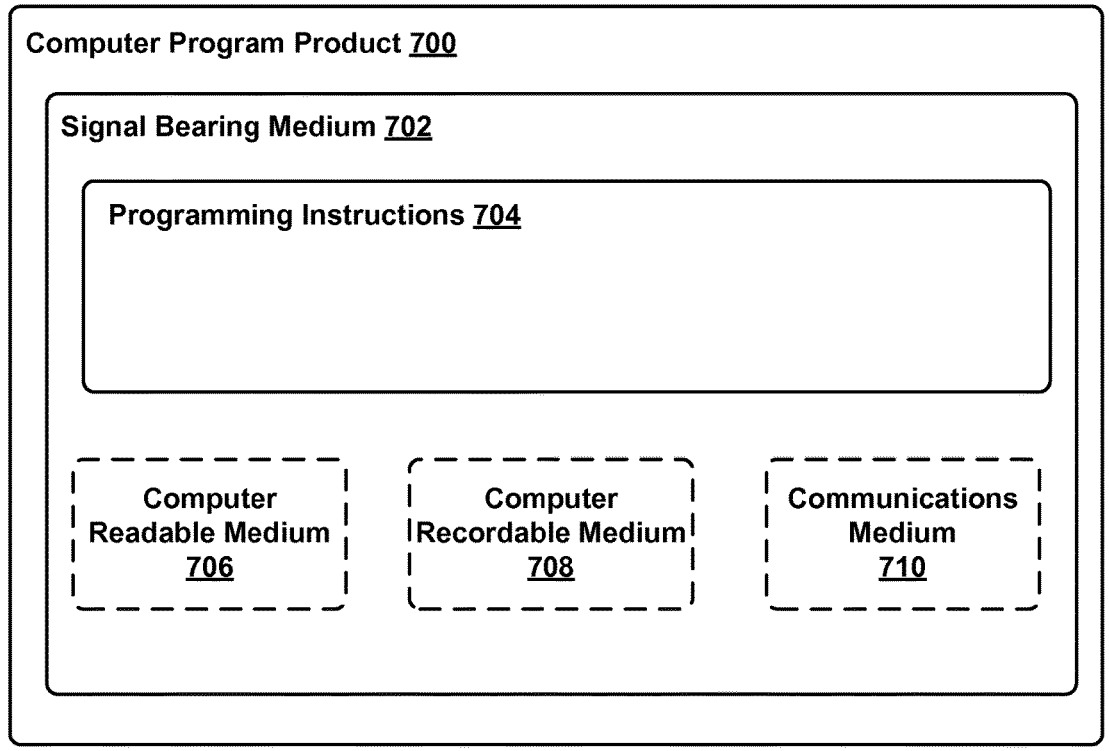
FIG. 7 depicts an example computer readable medium configured in accordance with at least some embodiments herein.

FIG. 7 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., methods 300, 400, 600, etc.) may be implemented by computer program instructions encoded on a computer readable storage media in a machine-readable format, or on other media or articles of manufacture (e.g., rogram logic 510 of the device 500, etc.). FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may be a computer-readable medium 706, such as, but not limited to, a hard disk drive, a Compact Disc (CD), a Digital Video Disk (DVD), a digital tape, memory, etc. In some implementations, the signal bearing medium 702 may be a computer recordable medium 708, such as, but not limited to, memory, read/write (R/W) CDs, R/W DVDs, etc. In some implementations, the signal bearing medium 702 may be a communication medium 710 (e.g., a fiber optic cable, a waveguide, a wired communications link, etc.). Thus, for example, the signal bearing medium 702 may be conveyed by a wireless form of the communications medium 710.

The one or more programming instructions 704 may be, for example, computer executable and/or logic implemented instructions. In some examples, a computing device may be configured to provide various operations, functions, or actions in response to the programming instructions 704 conveyed to the computing device by one or more of the computer readable medium 706, the computer recordable medium 708, and/or the communications medium 710.

The computer readable medium 706 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An encoder comprising:
a disk to rotate about an axis;
a first index mark on the disk at a first location associated with the disk being at a first orientation about the axis;
a second index mark on the disk at a second location associated with the disk being at a second orientation about the axis, wherein the first orientation is at an offset angle to the second orientation;
a detector to provide an index signal indicating detection of an index mark being aligned with the detector; and
a controller to:
responsive to rotation of the disk, receive a first index signal provided by the detector, and a second index signal provided by the detector after the first index signal;
obtain a measurement of an angle of rotation of the disk between provision of the first index signal by the detector and provision of the second index signal by the detector; and
based on at least the measurement of the angle of rotation being different from the offset angle, identify a defect in the encoder.

2. The encoder of claim 1, further comprising:
a plurality of incremental marks on the disk, wherein adjacent marks of the plurality of incremental marks are separated by a particular distance, wherein the detector provides an incremental signal indicating detection of an incremental mark being aligned with the detector, wherein the controller receives a plurality of incremental signals provided by the detector between the first index signal and the second index signal, and wherein the controller determines the measurement of the angle of rotation based on at least a quantity of the plurality of incremental signals.

3. The encoder of claim 2, wherein the controller:
determines that a number of incremental signals provided by the detector for a complete rotation of the disk is different from a number of the plurality of incremental marks; and
responsively identifies a particular defect in the encoder.

4. The encoder of claim 1, wherein the controller, based on the measurement of the angle of rotation corresponding to a complete rotation of the disk about the axis, identifies the defect as a failure to detect one or more of the first index mark or the second index mark.

5. The encoder of claim 1, wherein the controller:
receives a third index signal after the second index signal, wherein the angle of rotation is a first angle of rotation;
obtains a measurement of a second angle of rotation of the disk between provision of the second index signal by the detector and provision of the third index signal by the detector; and
identifies the defect further based on the measurement of the second angle of rotation.

6. The encoder of claim 1, wherein the controller provides, based on the measurement of the angle of rotation being equal to the offset angle, an output indicative of an orientation of the disk about the axis.

7. A method comprising:
causing, by a computing device that includes one or more processors, a disk of an encoder to rotate about an axis, wherein the disk includes a first index mark at a first location associated with the disk being at a first orientation about the axis, wherein the disk includes a second index mark at a second location associated with the disk being at a second orientation about the axis, and wherein the first orientation is at an offset angle to the second orientation;
receiving a first index signal provided by a detector of the encoder, wherein the detector is configured to provide an index signal to indicate detection of an index mark being aligned with the detector;
receiving a second index signal provided by the detector after the first index signal;
obtaining a measurement of an angle of rotation of the disk between provision of the first index signal by the detector and provision of the second index signal by the detector; and
based on at least the measurement of the angle of rotation being different from the offset angle, identifying a defect in the encoder.

8. The method of claim 7, further comprising determining, based on at least the measurement of the angle of rotation being equal to the offset angle, an orientation of the disk about the axis.

9. The method of claim 7, further comprising:
identifying, based on the measurement of the angle of rotation corresponding to a complete rotation of the disk about the axis, the defect as a failure to detect one or more of the first index mark or the second index mark.

10. The method of claim 7, further comprising:
receiving a third index signal after the second index signal, wherein the angle of rotation is a first angle of rotation; and
obtaining a measurement of a second angle of rotation of the disk between provision of the second index signal by the detector and provision of the third index signal by the detector, wherein identifying the defect is based also on the measurement of the second angle of rotation.

11. The method of claim 10, further comprising:
based on at least the offset angle being equal to the measurement of the second angle of rotation, determining that the first index signal is a false index signal; and
based on at least the offset angle being equal to a sum of the measurement of the first angle of rotation and the measurement of the second angle of rotation, determining that the second index signal is a false index signal.

12. The method of claim 11, further comprising:
identifying a given orientation of the disk that is associated with the false index signal;

responsive to a complete rotation of the disk after provision of the false index signal by the detector, receiving another false index signal; and
responsively identifying the defect as a deformation on the disk that is aligned with the detector based on the disk being at the given orientation.

13. The method of claim 12, wherein the deformation comprises a scratch on a surface of the disk, or dust disposed on the surface of the disk.

14. The method of claim 7, further comprising:
receiving a plurality of incremental signals provided by the detector between the first index signal and the second index signal, wherein the disk includes a plurality of incremental marks, wherein adjacent marks of the plurality of incremental marks are separated by a particular distance, wherein the detector provides an incremental signal to indicate detection of an incremental mark being aligned with the detector, and wherein determining the measurement of the angle of rotation is based on a quantity of the plurality of incremental signals.

15. The method of claim 14, further comprising:
determining that a number of incremental signals provided by the detector for a complete rotation of the disk is different from a number of the plurality of incremental marks;
responsively identifying a particular defect in the encoder.

16. The method of claim 14, further comprising:
receiving a third index signal provided by the detector after the second index signal;
receiving a second plurality of incremental signals provided by the detector between the second index signal and the third index signal, wherein the plurality of incremental signals provided by the detector between the first index signal and the second index signal is a first plurality of incremental signals;
determining an expected number of incremental signals that correspond to a complete rotation of the disk;
determining a sum of: the quantity of the first plurality of incremental signals and a quantity of the second plurality of incremental signals;
based on the sum being greater than the expected number of incremental signals, identifying the defect as the detector providing one or more false incremental signals; and
based on the sum being less than the expected number of incremental signals, identifying the defect as a failure to detect one or more of the plurality of incremental marks.

17. A method comprising:
providing, by a computing device that includes one or more processors, a first index mark at a first location on an encoder disk, wherein the first location is associated with the encoder disk being at a first orientation about an axis;
providing a second index mark at a second location on the encoder disk, wherein the second location is associated with the encoder disk being at a second orientation about the axis, wherein the first orientation is at an offset angle to the second orientation, and wherein a detector is configured to provide an index signal to indicate detection of an index mark being aligned with the detector;
rotating the encoder disk about the axis;
receiving a first index signal provided by the detector, and a second index signal provided by the detector after the first index signal;
obtaining a measurement of an angle of rotation of the disk between receipt of the first index signal and receipt of the second index signal; and
based on at least the measurement of the angle of rotation being different from the offset angle, identifying a defect in the encoder disk.

18. The method of claim 17, wherein the offset angle is less than $\pi/3$ radians, and wherein the offset angle is greater than $\pi/6$ radians.

19. The method of claim 17, further comprising:
determining a likelihood that the encoder disk includes a deformation within a region of the encoder disk between the first index mark and the second index mark, wherein the deformation causes the detector to provide a false index signal; and
selecting the offset angle such that the likelihood is within a threshold range, wherein providing the second index mark is based on at least the selected offset angle and the first location of the first index mark.

20. The method of claim 19, further comprising:
rotating a plurality of encoder disks about axes of the plurality of encoder disks, wherein the plurality of encoder disks are associated with one or more detectors that provide signals responsive to the one or more detectors being aligned with one or more deformations on the plurality of encoder disks; and
based on the signals provided by the one or more detectors, determining a statistical relationship between presence of a given deformation within a given region of a given encoder disk and a size of the given region, wherein determining the likelihood is based on the statistical relationship.

* * * * *